United States Patent [19]

Zelenka

[11] Patent Number: 4,944,464

[45] Date of Patent: Jul. 31, 1990

[54] SOLDER DISPENSING APPARATUS AND METHOD OF OPERATION

[76] Inventor: Jerry L. Zelenka, 4410 N. Henley Ct., Westlake Village, Calif. 91361

[21] Appl. No.: 261,622

[22] Filed: Oct. 24, 1988

[51] Int. Cl.$^5$ .................................... B65H 75/00
[52] U.S. Cl. ............................ 242/54 R; 226/90; 226/127; 226/188; 226/187; 242/96
[58] Field of Search ................. 242/54 R, 96, 106; 226/90, 127, 187, 188, 196

[56] References Cited

U.S. PATENT DOCUMENTS

| | | |
|---|---|---|
| 1,794,733 | 3/1931 | Regenstreif . |
| 2,871,333 | 1/1959 | Savage ................................. 219/27 |
| 3,070,057 | 12/1962 | Dezzani ........................ 226/127 X |
| 3,390,826 | 7/1968 | Davis ................................. 228/53 |
| 3,391,844 | 7/1968 | Bell et al. ............................. 228/41 |
| 3,637,150 | 1/1972 | Butz ................................. 242/54 R |
| 3,658,225 | 4/1972 | Lace ............................. 226/90 X |
| 3,741,456 | 6/1973 | Smith ................................. 228/41 |
| 3,792,228 | 2/1974 | Wei-Cheng ...................... 219/230 |
| 3,822,839 | 7/1974 | Persichini .............................. 242/96 |
| 3,830,420 | 8/1974 | Milana et al. ........................... 228/9 |
| 3,973,741 | 8/1976 | Dean ................................. 242/106 |
| 3,990,622 | 11/1976 | Schurman, Jr. et al. ............. 228/53 |
| 4,138,048 | 2/1979 | Lemmon ............................. 226/152 |
| 4,199,096 | 4/1980 | Keefe et al. ................... 226/127 X |
| 4,206,862 | 6/1980 | DaCosta .............................. 226/178 |
| 4,493,449 | 1/1985 | Kleiman ............................... 228/7 |
| 4,540,136 | 9/1985 | Rauch ................................. 242/106 |
| 4,614,295 | 9/1986 | Kochli ................................. 228/53 |

*Primary Examiner*—John M. Jillions
*Attorney, Agent, or Firm*—John S. Christopher

[57] ABSTRACT

A solder dispensing apparatus having a pistol grip handle configuration housing a rechargeable power supply employed for energizing an electric motor which drives a set of pinch wheels for pulling a line of solder from an externally mounted solder spool through the dispensing apparatus and out a solder dispensing extension tip for improving the maneuverability and dispensibility of the line of solder to a designated solder joint through a maze of computer equipment printed circuit board obstructions while minimizing the probability of thermal damage to coaxial cable insulation by direct contact and permitting completion of a cleanly soldered joint on both sides of the printed circuit board within a critical time period for avoiding insulation damage caused by heat accummulation. The method of operation provides for operating a combination on-off, rate control trigger switch for energizing the electric motor through a voltage regulator and for improving sensitivity to speed changes resulting in very slow solder feed rates. A solder replenishing system is included for insuring convenient reloading of and access to the dispensing drive mechanism.

20 Claims, 6 Drawing Sheets

FIG. 6
PRIOR ART
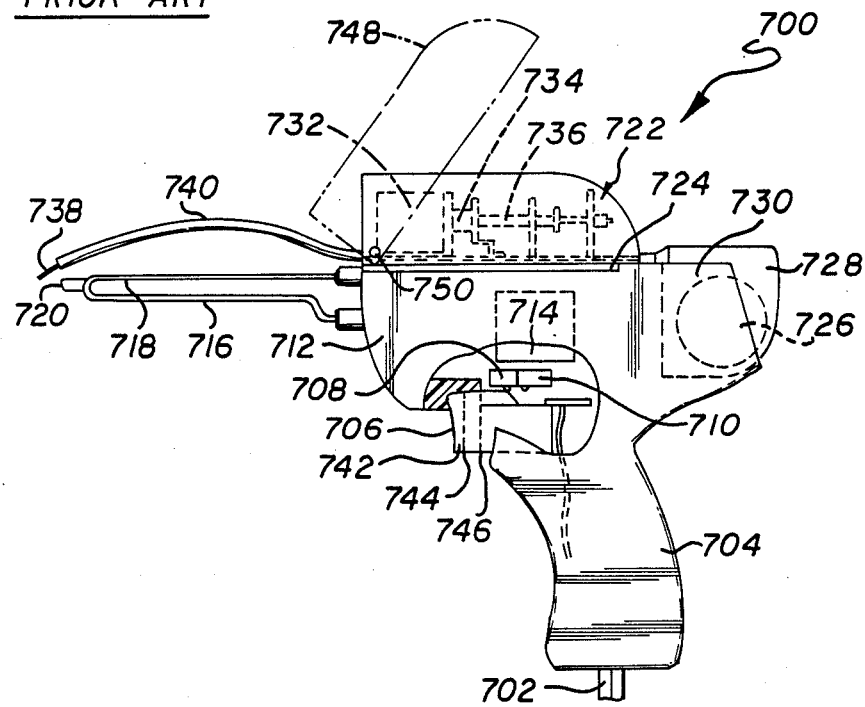
FIG. 8A
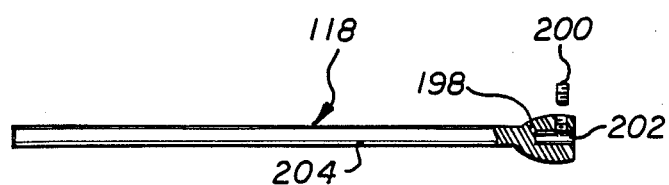
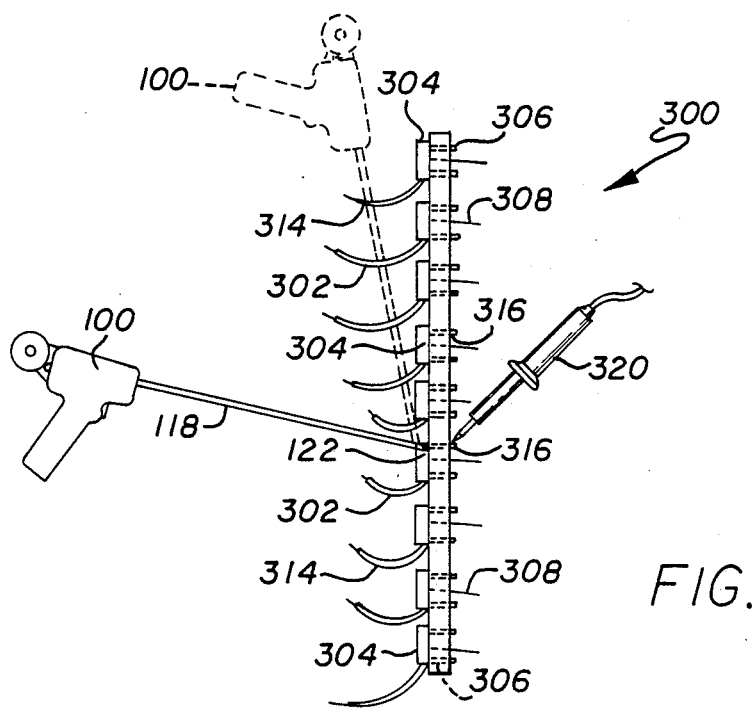
FIG. 8B

FIG. 11
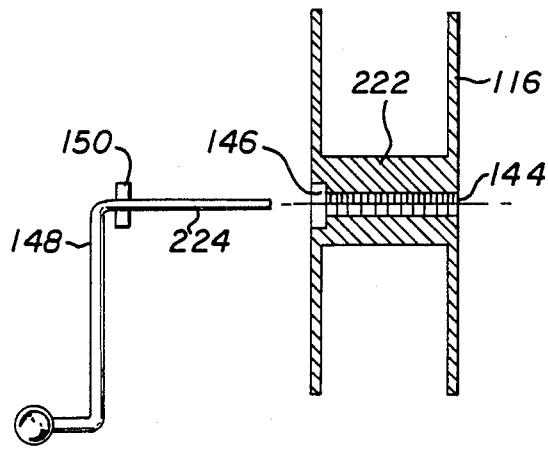
FIG. 12
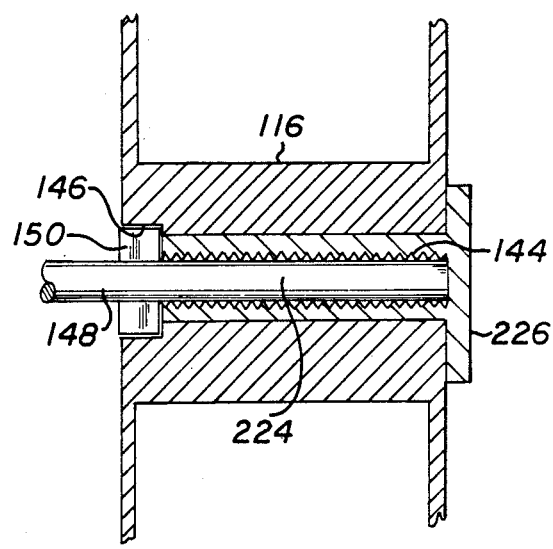
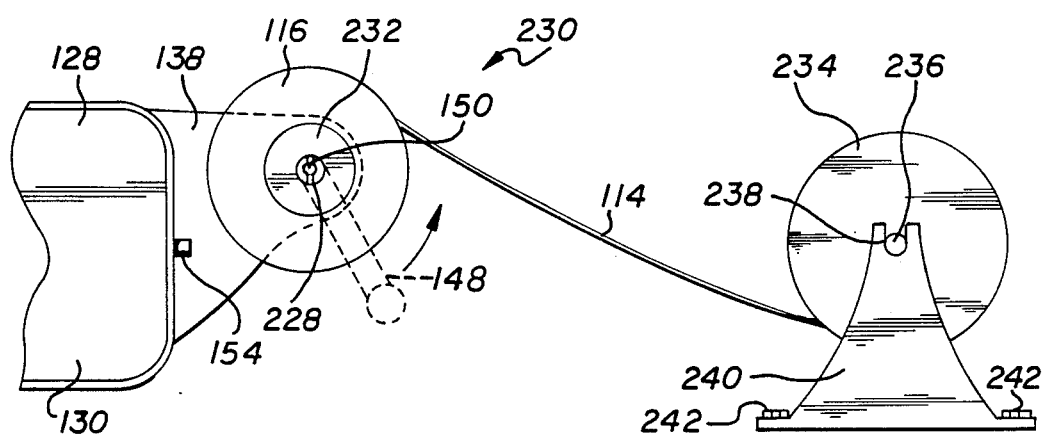
FIG. 13.

SOLDER DISPENSING APPARATUS AND METHOD OF OPERATION

BACKGROUND OF THE INVENTION

This invention relates to solder dispensing devices for use in electronic component assembly, and more particularly, to a new and improved solder dispensing device and method of operation, the device being of the type having a rechargeable battery power supply for energizing an electric solder feed motor and having a unique dispensing extension tip and a solder spool reloading mechanism.

In the field of electronic assembly, soldering of electronic components is a major concern in establishing continuous electrical contact for providing a pathway for signal transmission. An example of where this problem exists is in the computer industry. Large computers include a plurality of printed circuit boards which require literally hundreds of delicate coaxial cable connectors to be soldered thereto. Computer equipment is a good example because it is often necessary to solder joints which are located several centimeters beneath a layer of delicate coaxial conductors.

The procedure of holding metalic solder in one hand while applying heat with a soldering tool with the other hand is difficult because of the lack of accessibility to the designated solder joint. A further difficulty involves the inabilty to maneuver the hand holding the solder around the many delicate coaxial conductors attached to the printed circuit board. If the hand-held method is employed, a long piece of solder must be extended by several inches to reach the solder joint. Under these conditions, a measurable amount of the solder is left unsupported and usually bends or curves due to the soft characteristics of the solder alloy. The unsupported solder thus becomes unstable and often results in the inability to deposit the solder at a particularly soldering joint location on the printed circuit board.

It is common in the computer industry to employ a coaxial conductor connector at the end of a coaxial conductor wherein the coaxial conductor connector is utilized for connecting the coaxial conductor to the printed circuit board. The coaxial connector is designed to receive and seal a coaxial conductor from the rear side of the connector. The coaxial conductor comprises a structure commonly known in the industry which includes a bare conducter wire at the center of the cable which is separated from a concentric braided conductor by a layer of electrical insulation. Further, the braided conductor may be enclosed by yet another layer of insulation forming the exterior of the coaxial conductor.

The braided conductor is then electrically connected to the body of the coaxial connector so that the connector becomes an extension of the braided conducter. The layer of insulation surrounding the bare center conductor wire is then passed through a hooded body portion of the coaxial connector with the center conductor wire extending therefrom for connection to the proper location on the printed circut board. The coaxial connector body portion also includes a plurality of four connector legs extending therefrom for inserting into preformed penetrations within the printed circuit board. It is these preformed penetrations with the connector legs inserted therein, that must be completely filled with solder for insuring maximal signal transfer.

An acceptable soldering technique to be utilized on double sided printed circuit boards is to apply a source of heat from a soldering iron on one side and a supply of solder on the opposite side of the printed circuit board. The iron on one side and a supply of solder on the opposite side of the printed circuit board. This technique is practiced to ensure that the connector body of the coaxial conductor is completely soldered to the solder pads of the printed circuit board for providing maximum electrical transfer through the cable. The solder pad is generally a metallic section located on the printed circuit board which is utilized for making contact with the coaxial connector body.

The legs extending from the body of the connector are inserted into the preformed holes in the printed circuit board during assembly of the circuitry. Next, the solder supply is applied to the solder pad of the side of the printed circuit board which is to be electrically connected while the source of heat is applied to the opposite end of the preformed hole on the other side of the printed circuit board. Because the connector body is comprised of metal and is an extension other side of the printed circuit board. Because the connector body is comprised of metal and is an extension of the braided conductor, the solder will deposit on the connector body and on the connector legs filling the preformed holes through the printed circuit board. This soldering method ensures clean and electrically continuous solder joints.

Because the printed circuit boards employed in computer equipment can be, for example, approximately three feet wide and three feet long, hundreds of coaxial cables are distributed across the board. During the assembly of the board or during the repair of any particular circuit connected to the board, a cable located deep within the nest of wires is difficult to reach. Thus, a major problem that exists in the computer industry is that of accessing a particular solder joint and expelling a measured amount of solder to the solder joint while supporting and maneuvering the length of solder through a maze of obstructions. An equally vexing problem is that of avoiding direct overheating damage to the insulation of signal wire and completing the application of the solder to a joint within a time limitation for avoiding heat damage to delicate coaxial conductor insulation by heat transfer.

In repair situations which require the removal of a coaxial connector from the printed circuit board, a desoldering tool has been employed for removing the solder from the heated side of the soldering joint. However, upon resoldering the electrical connections in the repaired circuit, the same problems exist that were associated with the original assembly and wiring of the printed circuit board. Under these conditions, it is very difficult to maneuver the melted solder up the leg of the connector body and into the preformed holes of printed circuit body fast enough to avoid causing temperature damage to the delicate installation about the coaxial cable.

The soldering procedure of applying heat to one side of the printed circuit board and the solder to the opposite side is necessary for the following reasons. First, a sufficient amount of solder must be deposited on the body of the coaxial connector and within the upper and lower legs extending from the connector for ensuring maximum signal transfer through the coaxial cable. Next, a solder heating iron cannot be safely placed between the coaxial cables extending from the bodies of the connectors because of potential damage to the cable installation from the hot soldering iron. Finally, the heating cycle time for completing an actual soldering joint is extremely critical because the delicate coaxial conducter installation will not tolerate the extended time necessary for the molten solder to flow through the preformed holes in the printed circuit board if soldering was completely conducted from only one side of the board. Thus, if both the source of the heat and the solder were applied from the same side of the printed circuit board, an extended time would be required to direct the heated solder from the lower legs of the connector through the board and to deposit a sufficient amount of molten solder on the connector body to produce an acceptable soldered joint.

It has been found that completing the soldering task from a single side of the printed circuit board, for example, the side that the soldering iron is located on, permits soldering the lower parts of the legs extending from the conductor body. However, this technique was not acceptable because the entire connector body, which is an extension of the braided conductor of the coaxial cable, requires a sufficient quantity of solder to be deposited within the preformed holes of the printed circuit board for providing maximum signal transfer. Further, a one-handed gun that melts and expels solder is impractical for the very reasons described above.

An example of such a feed apparatus included a welding filler wire feed apparatus comprised of a handpiece, means for advancing filler wire through the handpiece in response to a signal produced by a finger pressure-sensitive switch on the handpiece, and a flexible conduit connecting the handpiece to the filler wire advancing means for passing the filler wire therethrough. The rate of filler wire advancement through the handpiece was adjustable. The mechanism further included wire alignment tubes for directing the filler wire through a pair of idler rollers under spring tension which were driven by the alternating current motor advancing means fed by a transformer through a standard rectifier unit. The finger operated switch activated a relay for energizing the motor while a second switch mounted on the handpiece operated a speed control variable potentiometer.

Another example included an electrical soldering gun incorporating a power cord extending from a pistol grip handle, a slidable trigger for actuating a heat switch and a solder wire feed switch. A central housing enclosed a conventional transformer which was employed for supporting a pair of low resistance electrical conductive elements that terminated in a soldering tip for providing heat sources. A solder wire advancing mechanism was selectively covered by means of a lid rotatively disposed about a hinge to be manually moved between an opened and closed position for readily exposing the solder advancing mechanism.

A further mechanism included a soldering wire feeding mechanism for feeding solder wire from a storage spool which was comprised of a DC motor for driving a feeding wheel for engaging and transporting the soldering wire into a flexible feeding tube. The electrical circuit included a transformer for providing an AC signal to a bridge rectifier circuit for providing direct contact to an electric motor by way of a voltage regulator. In parallel with the motor was a breaking circuit for speed control with the entire circuit controlled by a trigger switch.

In another embodiment, a solder gun included a body and a pistol handle operated by a trigger switch which activated a combination heating element and soldering tip. A transformer enclosed within the body was controlled by a trigger switch for limiting the heat to the solder tip by way of a potentiometer.

Other devices known in the prior art for dispensing solder wire typically include motor driven gear trains for driving a pair of pinch wheels for advancing a line of solder. Some of these devices include more sophisticated electrical control circuits which are driven by alternating current which is rectified and filtered for providing a DC voltage to the field of the solder advancing motor. One of the known circuits includes time delay relays in combination with a potentiometer for controlling the speed of the solder driving motor and further a silicon controlled rectifying circuit for controlling the line voltage to the drive motor.

Hence, those concerned with the development and use of solder dispensing devices in the electronic assembly field have long recognized the need for improved solder dispensing systems which provide means for supporting and expelling solder to a solder joint located on a printed circuit board in which such a solder dispensing device would be capable of maneuvering through a multitude of circuit obstructions. Further, such a dispensing system is necessary to deposit solder at a required location without directly burning the delicate insulation of the signal wire and which permits the completion of the soldering task within a critical time limitation for avoiding heat transfer damage to the delicate coaxial conductor. Further, the soldering device should permit access for soldering joints on both sides of a double sided printed circuit board, should include a geared reduction ratio for providing sensitivity to speed changes and low solder feed rates, and provide a convenient solder replenishing means including convenient access to the drive system of the solder feed device.

SUMMARY OF THE INVENTION

Briefly and in general terms, the present invention provides a new and improved solder dispensing construction which substantially improves the maneuvering and the expending of a line of solder to a designated solder joint through a maze of obstructions, and which significantly reduces the probability of thermal damage to delicate coaxial cable insulation by direct contact with molten solder over similar types of prior art solder dispensing devices. Moreover, the solder dispensing construction of the present invention permits access to both sides of a double-sided printed circuit board, permits completion of the soldering task within a critical time limitation for avoiding damage to conductor insulation by heat accumulation, provides sensitivity to speed changes resulting in very slow solder feed rates providing cleanly soldered joints, and provides a solder replenishing means for convenient reloading of and access to the dispensing drive mechanism.

Basically, the present invention is directed to an improved solder dispensing apparatus and method of operation for improving access to designated solder joints and the quality of the soldered joints for providing quality electrical connections between electronic components while simultaneously avoiding thermal damage to delicate coaxial cable insulation. This is accomplished by modifying the design of the on-off trigger switch by incorporating rate control circuitry therein and by employing a solder dispensing extension tip which improves the support, dispensability and maneuverability of the line of solder for simplifying access to a designated solder joint.

In accordance with the invention, as the on-off trigger switch is depressed, a variable rate control potentiometer is activated for controlling the speed of an energized motor for driving a pair of pinch wheels which pull a line of solder through the apparatus and out an extension tip for dispensing to a designated solder joint.

In accordance with the improved method of the present invention, after the trigger switch has been depressed an electrical circuit is completed through the motor via a voltage regulator which applies adjusted source voltage to the motor input terminals while the rate control potentiometer contributes to limiting the motor input current. The energized motor operates a gear train for driving the pair of pinch wheels which frictionally pulls the line of solder from a solder storage spool through inlet and outlet tubes and expels the solder from an extension tip directly to the designated solder joint.

The new and improved solder dispensing apparatus and method of operation of the present invention substantially improves the maneuverability and dispensability of the line of solder to the designated solder joint through wiring obstructions common on computer printed circuit boards and also reduces the probability of thermal damage to delicate coaxial cable insulation since the extension tip supports and delivers the solder directly to the designated joint. Also, the extension tip permits access to both sides of the circuit board permitting completion of a cleanly soldered joint within a time limit for avoiding insulation damage by heat accumulation. The combined on-off, rate control trigger switch provides speed change sensitivity resulting in very slow solder feed rates. Additionally, a replenishing means insures convenient reloading of and access to the dispensing device mechanism through a sliding window.

These and other features and advantages of the invention will become apparent from the foregoing more detailed description, when taken in conjunction with the accompanying drawings, which illustrate, by way of example, the features of the invention.

BRIEF DESCRIPTION OF THE DRAWINGS

FIG. 6 is a side elevational view of a semi- o automatic solder feeding apparatus of the prior art;

FIGS. 8(A-B) are side elevational views of an extension tip of the solder dispensing apparatus of FIG. 7;

FIGS. 11-13 are side elevational views of a solder replenishing system of the solder dispensing apparatus of FIG. 7.

DETAILED DESCRIPTION

Figure 1:
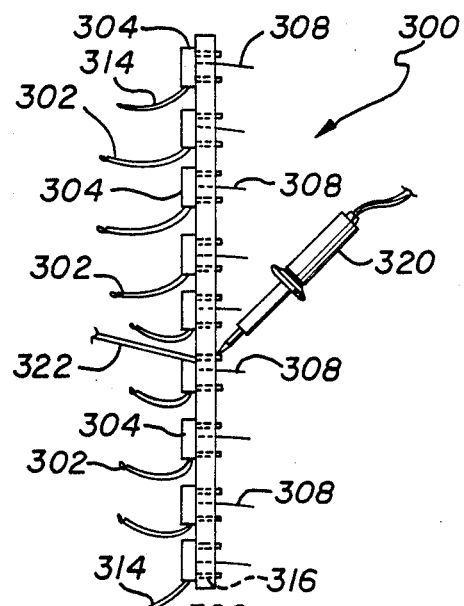
FIG. 1 is an elevational view of a typical computer system printed circuit board having a plurality of coaxial cable connectors mounted thereon and showing a soldering procedure known in the prior art.

As shown in the drawings for purposes of illustration, the invention is embodied in a solder dispensing apparatus 100 of the type having a pistol grip handle configuration 102 which houses a rechargeable power supply 104 and a combination on-off, rate control trigger switch 106 employed for energizing a motor 108 which drives a set of pinch wheels 110, 112 for pulling a line of solder 114 from an externally mounted solder spool 116 through the dispensing apparatus 100 and out a solder dispensing extension tip 118.

In electronic and computer equipment printed circuit board assembly, electrical connections are completed by utilizing a solder alloy for binding the electrical connections together while the solder alloy is in a molten state. Because of the small voltages employed for transmitting signals in electronic and computer equipment, it is extremely important that the quality of the soldered joints is very high. Thus, when a component is inserted through a predrilled hole within a printed circuit board, it is necessary to insure that the molten solder completely fills the predrilled hole. Thus, upon solidifying, the solder connection should be continuous from one electronic component to the next for insuring electrical continuity.

Figure 2:
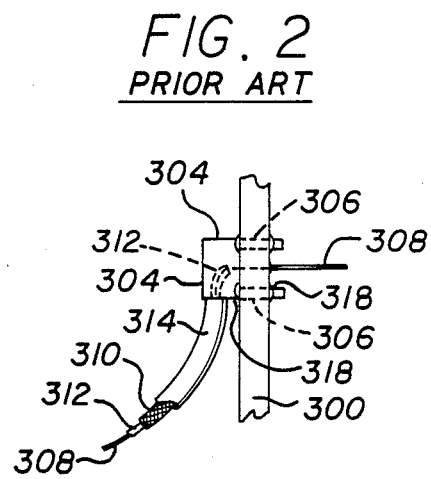
FIG. 2 is a detail elevational view of a single coaxial cable connector mounted within the printed circuit board of FIG. 1.

A printed circuit board 300 may include hundreds of coaxially conductors 302 extending from the printed circuit board with a coaxial conductor connector body 304 interfacing the coaxially conductor 302 to the printed circuit board 300. Generally, the printed circuit board is double sided and includes a plurality of preformed penetrations 306 for receiving the connector bodies 304. The conductors 302 interface with the bottom of the connector body 304 as is shown in FIG. 2. Each of the coaxial conductors further include a center wire conductor 308 surrounded by an outer braided wire conductor 310, each conductor being separated by a layer of inner coax insulation 312. The outer braided wire conductor 310 is likewise enclosed by a layer of outer coaxial insulation 314 as is more clearly shown in FIGS. 2 and 3.

Figure 3:
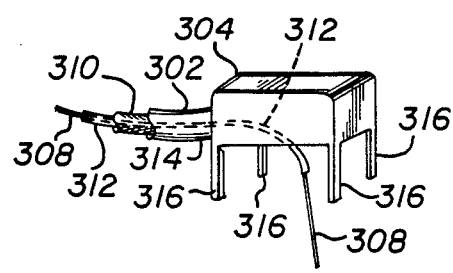
FIG. 3 is a perspective view of the single coaxial cable connector of FIG. 2.
Figure 4:
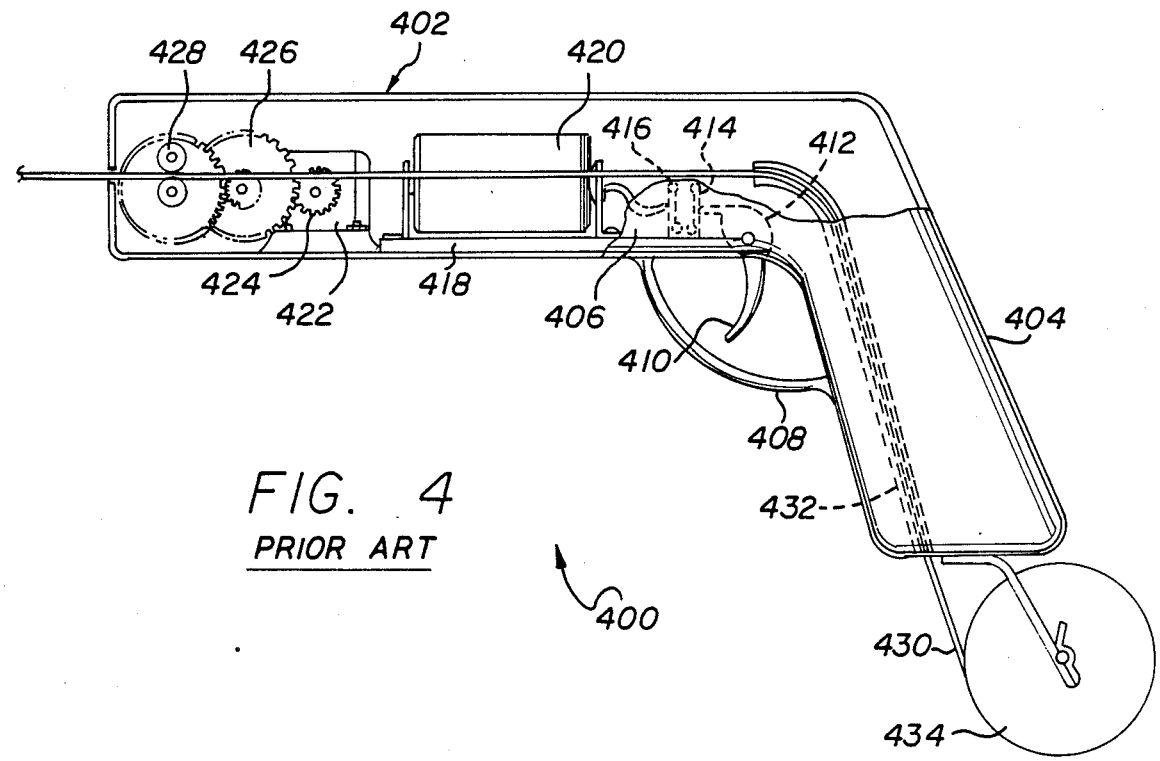
FIG. 4 is a side elevational view of a tape dispensing apparatus of the prior art.

Each of the connector bodies 304 includes a plurality of four body legs 316 which are clearly shown in FIG. 3 and which are designed to fit into the penetration 306 preformed and distributed on the printed circuit board 300. As illustrated, the coaxial cable includes concentric conductors with the center wire conductor 308 fitting within the outer braided wire 310 and separated by insulation. The center wire conductor extends beyond the connector body for being wired to other portions of the circuitry mounted on the printed circuit board. However, the outer braided wire conductor 310 is in electrical communication with the connector body which is metallic and conductive. Therefore, after the plurality of body legs are fitted into the preformed penetrations 306, solder must be deposited not only on the surface of the connector body but also continuously through the preformed penetrations. The printed circuit board includes a plurality of solder pads 318 on each side of the board so that there are soldered joints located between the connector body and the solder pads on each side of the printed circuit as is illustrated in FIGS. 1 and 2.

The printed circuit boards 300 are constructed so their approximate dimensions are three feet wide by three feet high with literally hundreds of coaxially conductors 302 distributed about the board. The task of repairing or assembling a connector body 304 and associated conductor onto the printed circuit board and deep within the maze of distributed conductors results in the problem of accessing the designated solder joint with the necessary equipment. An accepted method of soldering the connector body to the circuit board solder pad has been to employ a soldering iron 320 on the side of the printed circuit board opposite to the side in which the connector body is being mounted. Because the preformed penetrations 306 are generally cylindrical and plated through with metal for maximizing signal conductivity, the soldering iron will transmit sufficient heat through the preformed penetration to cause a manually held line of solder 322 to melt between the connector body 304 and the solder pad 318 as shown in FIG. 1.

Some of the problems associated with the soldering practices used in the past include the unsanitary conditions which are present when the line of solder 322 is handled and in contact with human skin. Body oils associated with the skin may be transferred to the line of solder which will interfere with the binding process between the electrical components which are soldered ultimately resulting in reduced electrical conduction. Also, during the soldering process air may be absorbed into the molten solder as it settles on the metallic surfaces to be soldered. As the solder joint cures, the air causes a bubbling effect which forms on the surface of the solder joint. Upon the release of the air and the collapsing of the solder bubble, a "pop" of molten solder may be splashed onto the skin of the person performing the soldering function. Series burns and lead contamination have resulted from the exploding of these pops.

Finally, the most serious problem results from the fact that many assembly and repair operations are completely inaccessible to the human hand because of the number of coaxial conductors 302 connected to the printed circuit board 300. Therefore, extended lengths of solder must be hand held with the end of the line of solder being directed to the designated solder joint. By its very nature, electrical solder is soft and has a low melting point. Therefore, extended lengths of solder 322 are very difficult to fish through the maze of wiring obstructions to reach the designated solder joint. Therefore, support, dispensability and maneuverability of the extended line of solder 322 have been problems in the soldering art in the past.

The soldering iron must be placed on the penetration 306 formed through the printed circuit board before the solder can be melted on the opposite side of the designated solder joint. If maneuvering the line of solder to the solder pad 318 is difficult, thermal accumulation at the solder pad in contact with the soldering iron 320 may become over heated. This can result in damage to the delicate coaxial connectors 302 by direct contact with the heat or by thermal accumulation resulting in damage to the conductor insulation.

Many soldering devices, combination soldering and solder dispensing devices, and devices for dispensing materials other than solder have been developed in the past for eliminating some of the aforementioned problems. Some of the devices known in the past have been associated with sophisticated industrial soldering and welding machinery while other non-solder dispensing devices have been designed for hand use.

An example of a hand device for dispensing a material other than solder is a dispenser 400 which includes a body 402 defining an elongated hand grip 404 terminating at one end in an elongated support 406. The body includes an arcuate trigger,. guard 408 for protecting a trigger type actuator 410 which is supported by the body and includes an abutment arm portion 412 engaged with a swingable contact 414 of a switch assembly 416. A battery mount 418 is supported within the elongated support 406 and removably supports a battery 420 therefrom. The free end of the elongated support 406 also encloses an electric motor 422 and a jack shaft 424 which extends transversely for supporting a gear train 426 which operates a pair of resilient rollers 428 for pulling a line of ribbon or ribbon-like decoration material 430 through a channel or flange 432 from a storage spool 434.

Figure 5A:
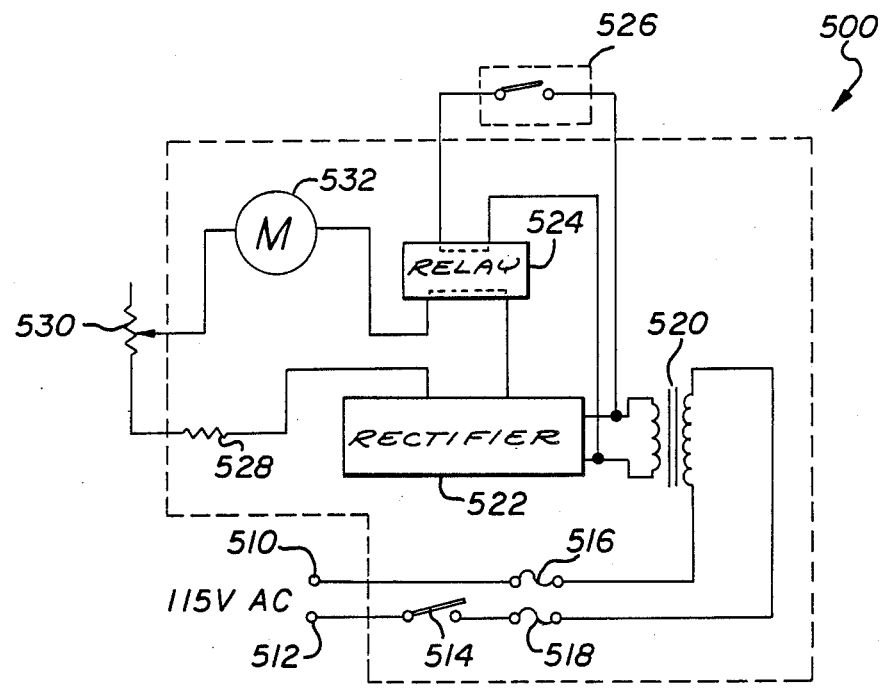
FIGS. 5(A-B) are control circuit diagrams of feed and soldering devices of the prior art.
Figure 5B:
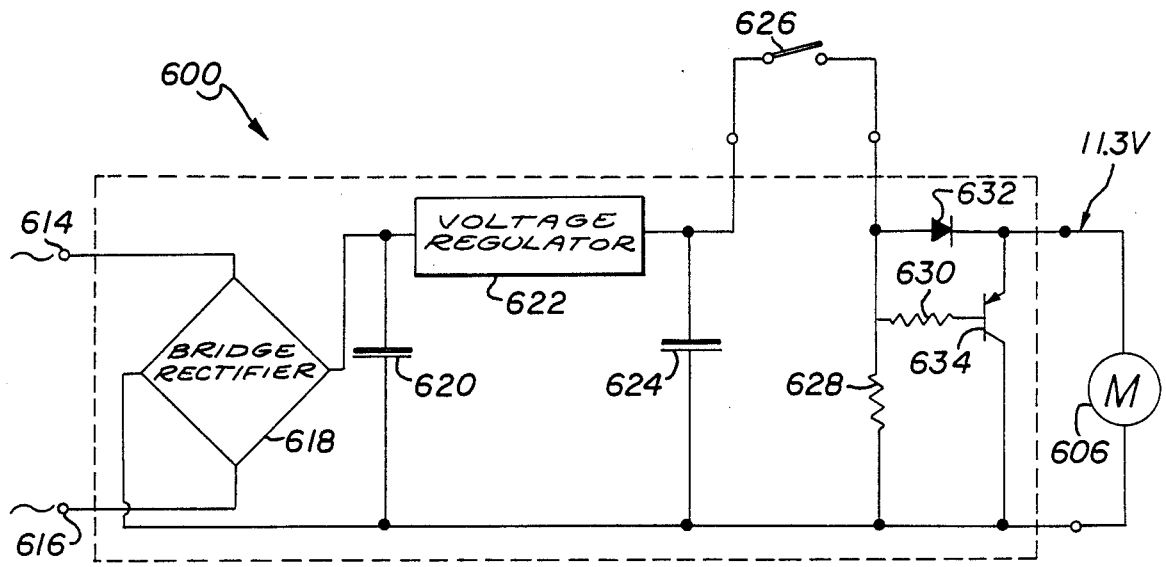

Examples of wire feed and soldering apparatus exhibit control electrical circuitry which is of interest, the schematic diagram of such devices being illustrated in FIGS. 5A-B. In the first example, a welding filler wire feed apparatus 500 includes a hand-piece means for advancing the filler wire through the handpiece in response to a signal produced by a finger pressure sensitive switch located on the handpiece. Also included is a flexible conduit which is employed for connecting the handpiece to the filler wire advancement means for passage of the filler wire therethrough. The rate of wire advancement through the hand piece is adjustable. The electrical circuit discloses a 115 volt, 60 Hertz alternating current supplied to a pair of input terminals 510, 512 through an on/off switch 514 and a pair of fuses 516, 518. A transformer 520 is provided for stepping down the input voltage which is delivered to a rectifier 522. Additional voltage is taken off the output of the transformer 520 for input to a relay 524 which is controlled by a switch 526 located on the handpiece. Direct current is delivered from the rectifier 522 through a resistor 528, a variable potentiometer 530 and through the switched output terminals of relay 524 to an electric motor 532.

By applying finger pressure to the sensitive switch on the handpiece, the input terminals of relay 524 are energized which closes the output terminals of the relay completing an electric circuit which includes the motor 532. This permits electric current to be circuited from the input terminals of the rectifier 522 to the motor 532 which operates a drive wheel for advancing the filler wire from a storage spool. By varying the setting of variable potentiometer 530, the operator can adjust the rate of advancement of the filler wire by controlling the speed of the motor 532. The wire advance means may also be fabricated with a combination on/off variable potentiometer switch serving the function of both the sensitive switch and the variable potentiometer 530 mounted in the hand piece as is illustrated in FIG. 5A.

An additional example is illustrated by a soldering apparatus 600 which includes a soldering wire feeding mechanism for feeding solder wire from a storage spool. The soldering wire feeding mechanism includes an electric motor 606 which drives a feeding wheel for engaging and transporting soldering wire in a flexible feeding tube.

The electric motor 606 is geared, thus forming part of a drive means. An isolating transformer 612 provides a voltage of approximately 24 volts AC which is delivered to the input terminals 614 and 616 of a bridge rectifying circuit 618. The pulsating direct current output of the bridge rectifier is smoothed by a capacitor 620. A voltage regulator 622 connected to the capacitor provides a 12 volt direct current across a further capacitor 624 which prevents possible oscillation. The 12 volt signal is fed through an operation switch 626 which is located on the soldering apparatus 600 and which drives the geared motor 606 as is illustrated in FIG. 5B.

The additional components shown define a circuit which breaks and stops the motor when the switch 626 is opened. Those components include a first resistor 628, a second resistor 630, a diode 632, and a transistor 634. Under normal conditions, the emitter base junction of transistor 634 is reversed biased and the motor operates at approximately 11.3 volts when switch 626 is closed. Diodes 632 conducts but the transistor 634 remains reversed biased until the combination of resistors 628 and 630 caused the voltage at the base of transistor 634 to forward bias the base emitter junction. Under these conditions, transistor 634 conducts as long as the emitter receives a positive voltage from the motor 606. The conducting transistor short circuits the poles of the motor so that the motor operates as an electrically loaded generator resulting in the effective braking of the rotating elements.

The final example is illustrated by an electric soldering gun 700 which is fed alternating current through a power cord 702 extending from a pistol grip handle 704, a slidable trigger 706 for actuating a heating switch 708 and a solder wire feed switch 710. A central housing or body portion 712 encloses a conventional transformer 714 and is employed for supporting a pair of low resistance electrically conductive elements 716, 718 that terminate in a soldering tip 720 which is heated in a known manner.

The electric soldering gun 700 includes a solder advancing mechanism 722 which is secured to a mounting surface 724 and which withdraws soldering wire from a solder coil 726 mounted on a cartridge 728 which is secured within a recess 730. The solder advancing mechanism includes a solenoid 732 directly connected to a armature plunger 734 and to an articulated linkage 736 for advancing a solder portion 738 through a flexible guide tube 740. It can been seen that position 742 is the normal off position of slidable trigger 706. Upon depressing the trigger to a position 744, heating switch 708 is activated resulting in the heating of the soldering tips 720. Upon further depressing of the trigger switch to position 746, the solder portion 738 from the solder coil 726 is advanced a predetermined amount by the operation of the solenoid 732 in the armature plunger 734. The entire soldered advancing mechanism 722 is covered by means of a lid 748 which is rotated about a hinge 750 for opening and closing the lid.

In accordance with the present invention, the combination on-off, rate control trigger switch 106 and a pinch wheel release button 120 cooperate with the solder dispensing extension tip 118 for substantially improving the maneuverablility and dispensability of a line of solder 114 to a designated solder joint 122 through a maze of obstructions and significantly reduces the probability of thermal damage to delicate coaxial cable insulation 124 by direct contact with molten solder. Further, the extension tip 118 connected to a solder outlet tube 126 of the solder dispensing apparatus permits access to both sides of a double-sided printed circuit board and permits completion of the soldering task within a critical time limitation for avoiding damage to conductor insulation by heat accumulation, provides sensitivity to speed changes resulting in very slow solder feed rates and cleanly soldered joints, and provides a solder replenishing means for convenient reloading of and access to the dispensing drive mechanism.

The construction of the solder dispensing apparatus 100 includes a casing 128 which is comprised of a first portion 130 and a second portion 132 separated along a center line of the casing 128. The front of the casing is covered by a plate 134 which is secured in position by a plurality of fasteners 136. Alternately, the cover plate 134 may be integrally formed with the first portion 130 or the second portion 132 of the casing.

The pistol grip handle configuration 102 is hollow for housing the rechargeable power supply 104 which is comprised of a nickel-cadmium battery pack which is cordless and completely portable. Because this power supply is well known in the art, further description will not be included. However, when the solder dispensing apparatus 100 incorporating the nickel-cadmium battery pack is used in conjunction with a cordless soldering iron, a completely portable, cordless soldering system is created.

Figure 7:
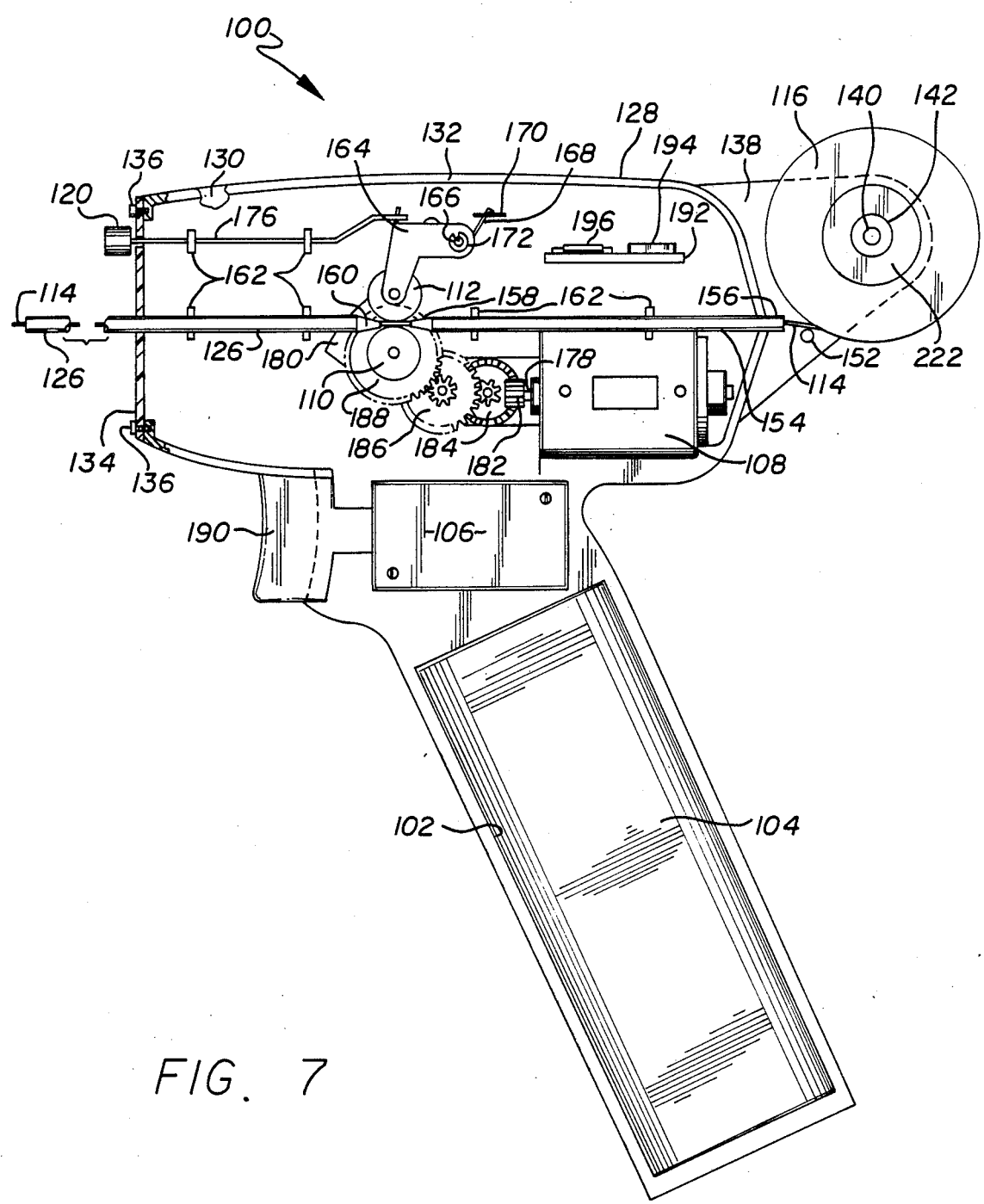
FIG. 7 is a side elevational view of a solder dispensing apparatus in accordance with the present invention.

The solder spool 116 is mounted on a spool bracket 138 which is attached to the rear end of the casing 128. The bracket may be comprised of a metal, such as aluminum, or durable plastic and includes a retaining screw 140 and a washer 142 employed for retaining the solder spool 116 in position. The solder spool in conjunction with a driving circuit to be discussed herein below control the supply of solder to the dispensing apparatus 100. The retaining screw 140 which secures the solder spool to the spool bracket 138, may be any of a plurality of fastening devices such as, for example, an Allen screw. If the solder spool 116 must be removed from the spool bracket, the Allen screw may be removed so that the solder spool may be immediately released from the bracket as is illustrated in FIG. 7. It should also be noted that upon the removal of the retaining screw 140, a threaded channel 144 which normally receives the thread of the retaining screw, also includes a keyway 146. The keyway 146 and the threaded channel 144 are designed to receive a cranking handle 148 having a matching key 150, the combination being employed for replenishing the solder spool 116 with solder as is illustrated in FIGS. 11–13 and will subsequently be explained in more detail.

The line of solder 114 is taken off the bottom of the solder spool 116 and is directed over a guide pin 152 which is secured to the spool bracket. The line of solder is then directed to an inlet tube 154 which is slightly flared at the receiving end 156. The opposite end of the tube 154 includes a tapered end 158 while a receiving tapered end 160 of the solder outlet tube 126 is aligned therewith. Note that the line of solder 114, the inlet tube 154, and the outlet tube 126 are each supported by a plurality of support hoops 162 which also maintain alignment between the inlet and outlet tubes. The hoops 162 may be comprised of a thin layer of sheet metal or flexible wire or may be molded from plastic and integral with the casing 128.

The inlet and outlet tubes are separated so that the drive pinch wheel 110 which may be comprised of, for example, rubber can grasp and pull the line of solder out of the inlet tube and drive the solder into the outlet tube. By providing the tapered ends 158, 160 at the interface between the drive wheel and the idler pinch wheel 112, the line of solder is more easily pulled through the tubes. The outlet tube 126 may by design be rather short but has been adapted to receive one of a plurality of the solder dispensing extension tips 118 as will be described hereinafter. The extension tips permit the solder dispensing apparatus to easily access any one of a plurality of designated solder joints 122 through a maze of wiring obstructions which normally appear on computer circuit boards.

The idler pinch wheel 112 appears above the inlet and outlet tubes and is a free wheeling idler member which acts to compress the line of solder 114 against the drive wheel 110. The idler pinch wheel is connected to a tension mechanism lever arm 164 which is mounted on a pivot shaft 166. A coil spring 168 is mounted between a spring stem 170 and the lever arm 164 for providing a downward force on the idler wheel 112. A fastener 172 is employed for holding the tension mechanism lever arm onto the pivot shaft 166.

Connected to the top of the tension mechanism lever arm 164 is a linkage shaft 176 which is supported by a plurality of hoops 162. The opposite end of the linkage shaft 176 is connected to the pinch wheel release button 120 extending through the cover plate 134 at the forward end of the dispensing apparatus 100. By depressing the release button 120, a force is transmitted along the linkage shaft 176 directly to the top of the lever arm 164 against the coil spring 168. The lever arm is caused to rotate about the pivot shaft 166 releasing idler wheel 112 for feeding the line of solder 114 between the pinch wheels.

The purpose of the pinch wheels 110, 112 is to drive the line solder 114 through the dispensing apparatus 100. The drive pinch wheel 110 is driven by a gear train having the motor 108 as the prime mover. Upon activation of the combination on-off, rate control trigger switch 106, the electric motor is energized for rotating a motor main shaft 178. The gearing system includes a plurality of toothed gears comprised preferably of metal and which provide the necessary gear reduction to the motor main shaft 178 for developing sufficient torque for pulling the line of solder 114 through the apparatus 100.

A gear system 180 includes a first gear 182 attached to the motor main shaft 178 and is generally referred to as a pinion gear. The first gear meshes with a second gear 184 which is a circular gear positioned for meshing with a third gear 186. The third gear 186 is larger than the second gear 184 but smaller than a fourth gear 188 which directly rotates the drive pinch wheel 110. Because of the gearing reduction associated with the gear system 180, the solder flow or the movement of the line of solder 114 may be stopped very quickly when a trigger actuater 190 is released disconnecting the trigger switch 106. The gear reduction provides for more sensitivity to speed changes for controlling the variable requirements of the flow of the line of solder. By combining the high revolution electrical motor 108 with a properly designed gear system 180, very slow solder feed rates are available which contribute to cleanly soldered joints.

The electric motor 108 is preferably a 12-volt direct current motor which is energized from the rechargeable direct current power supply 104 located within the pistol grip handle 102. The direct current motor is of the type having the characteristics of high starting torque in combination with variable speed control. The output of the electric motor drives the motor main shaft 178 and the first gear 182.

The trigger switch 106 is a spring-loaded momentary-on device which is a combination of an on-off switch and a variable potentiometer and is clearly illustrated in FIG. 10, discussed hereinafter. By operating the trigger actuator 190, the trigger switch 106 closes the on-off portion of the switch providing electrical power across the polarized terminals of the electric motor 108. The level of resistance exhibited by the variable potentiometer of the trigger switch 106 varies with the position of the trigger actuator 190. The greater the depression of the trigger actuator 190, the higher the resistance of the variable potentiometer for causing a higher revolution output of the electric motor. The appropriate gear reduction provided by the gear system 180 will cause the drive wheel 110 to increase in speed drawing the line of solder 114 through the inlet tube 154 and the outlet tube 126 at a higher rate of speed. Depressing the trigger actuator 190 closes the on-off switch and applies direct current voltage to the motor windings resulting in the production of rotational torque. The variable potentiometer located in the trigger switch 106 regulates the solder feed rate by controlling the flow of direct current from the rechargeable power supply 104 to the motor windings.

The solder dispensing apparatus 100 further includes a printed circuit board 192 mounted within the confines of the casing 128. The printed circuit board includes a voltage regulator 194 and a resistor 196. The regulator 194 is employed for controlling the voltage to the input of the motor with the assistance of the resistor 196 which is utilized for developing the proper voltage thereacross. The circuitry employed in the voltage regulator 194 is well known in the art and will not further be discussed.

The first portion 130 and the second portion 132 of the casing 128 may be held together by any appropriate means such as, for example, set screws. Access to the interior of the solder dispensing apparatus 100 may be had by removing the set screws and disassembling the first and second portions of the casing. However, normal access to the power supply 104 is through the bottom of the pistol grip handle configuration 102. The power supply can be rapidly and conveniently replenished with an alternate supply for providing uninterrupted use. The power supply is comprised generally of a nickel-cadmium rechargeable battery pack having a mean average potential of 9.6 volts D.C. Recharging of the power supply is accomplished through the use of an alternating current power pack charging device.

The solder dispensing extension tip 118 may be conveniently attached to the end of the solder outlet tube 126 by a clamp 198 which incorporates, for example, an Allen set screw 200 as is illustrated in FIG. 8A. The solder outlet tube conveniently fits within a hollow portion 202 of the clamp 198. Upon placing the outlet tube within the hollow portion 202, the set screw 200 may be tigthened for securing a shaft 204 of the extension tip 118 to the outlet tube 126. The clamp 198 may be employed for accommodating a variety of extension tips which may be comprised of lengths ranging from three inches to twelve inches. Further, the tips may be coupled to each other in a tandem fashion for forming a unique extra long extension tip for certain applications.

One of the major advantages of employing the solder dispensing apparatus 100 is in the utility of the extension tip 118. The line of solder 114 which was applied by hand as previously illustrated in FIG. 1 is now pulled through the inlet and outlet tubes 154, 126 and delivered to the extension tip 118 for application directly to the designated solder joint 122. The line of solder is extruded from the end of the extension tip on one side of the preformed penetration 306 of the circuit board 300 when the soldering iron 320 is applied to the opposite side of the preformed penetration of the designated solder joint.

During initial assembly of the printed circuit board 300, the soldering procedure may require that the solder dispensing apparatus 100 be positioned as shown by the darkened color symbol in FIG. 8B. However, during repair or other assembly procedures, the dispensing apparatus may be positioned as shown in the dotted outline to insure access to the designated solder joint 122. By applying the solder at the end of the extension tip 118 directly to the solder pad 318, cleanly soldered joints will result.

During the soldering procedure, a condition known as a soldering "pop" may occur when too much solder is applied to the designated solder joint. Under these conditions, the solder tends to bubble and may flash over onto the printed circuit board short circuiting adjacent electrical components resulting in electrical malfunctions. Further, because the solder is in a molten state, if the solder "pop" bursts, burns to person and property that are close to the solder joint such as hands and clothing can result.

Once the extension tip 118 is secured to the solder outlet tube 126, the final physical contact with the solder is made when the solder spool 116 is mounted onto the guide pin 152 of the spool bracket 138. Thus, burns and lead contamination of the skin due to exploding solder "pops" are greatly reduced because the hands are removed from the designated solder joint. Further, otherwise inaccessible designated solder joints 122 are easily reached with the various lengths of the extension tip 118 which provide physical support for the line of solder 114 and eliminate the need for directly handling the solder. The extension tip 118 is available in various lengths which permits the dispensing apparatus to be positioned to suit the particular needs of the soldering application. The extension tips can be interconnected with one another for creating a long support tube for special soldering tasks.

Figure 9:
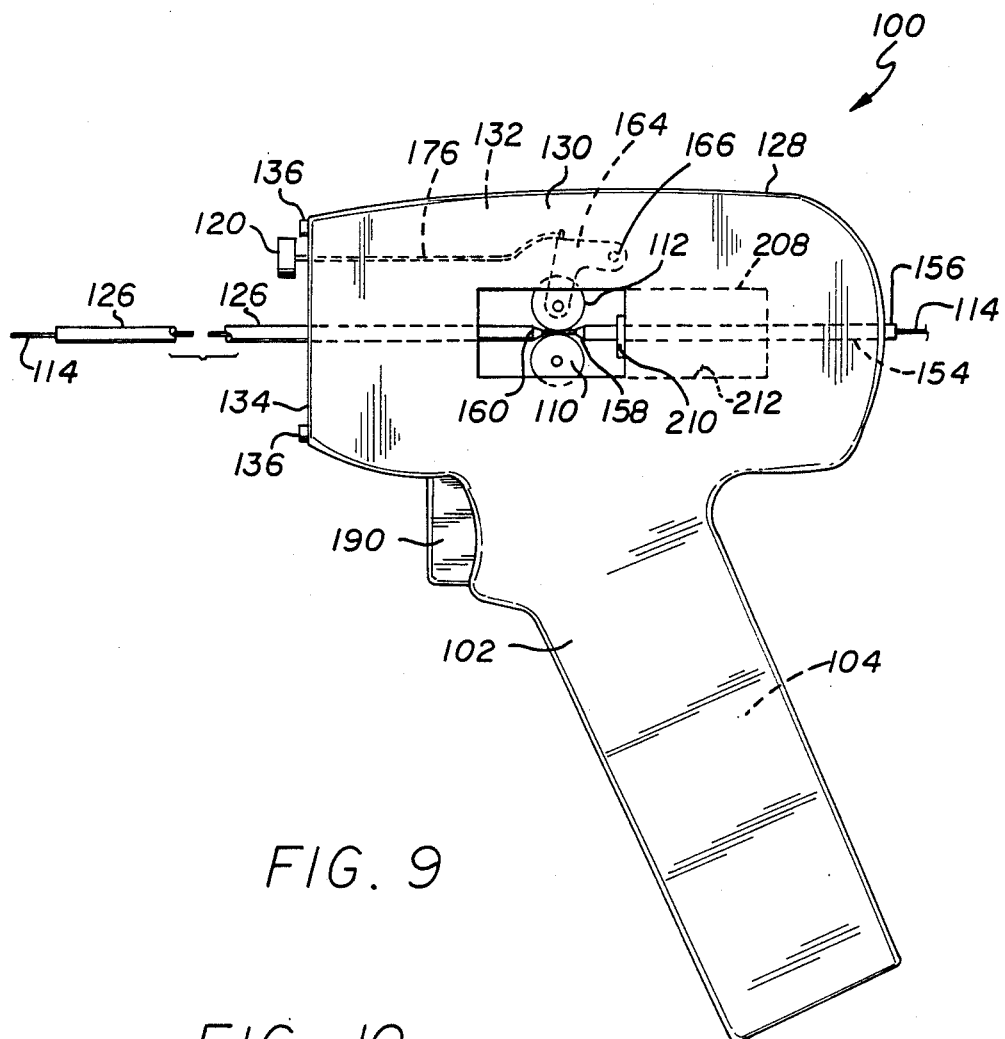
FIG. 9 is another side elevational view of the solder dispensing apparatus of FIG. 7 illustrating a sliding access window.

The solder dispensing apparatus 100 further includes a sliding window panel 208 having a finger tab 210 for operating the panel as shown in FIG. 9. The panel may be comprised of the same material which forms the casing 128 and rides in a groove 212 formed on the inside of the first portion 130 of the casing 128. The sliding window panel 208 permits access to the pinch wheels 110, 112 during the loading of solder and for inspection of the proper functioning of the gear system 180.

During the loading of solder, the panel 208 may be opened by manually forcing the tab 210 to the right so that the pinch wheels 110, 112 are exposed. Under these conditions, alignment and insertion of the solder is permitted and a mechanical persuader, such as, a pair of tweezers may be employed for pulling the line of solder 114 from the tapered end 158 of the inlet tube 154 into the breach located between the drive and idler pinch wheels. The receiving tapered end 160 of solder outlet tube 126 may be slightly flared for assisting in guiding the line of solder into the outlet tube.

In order to insert a new line of solder 114 into the solder dispensing apparatus, the pinch wheel release button 120 is depressed for operating the lever arm 164 about the pivot shaft 166. This results in the release of the idler pinch wheel 112 which moves away from the drive pinch wheel 110 in a clockwise manner. The movement of the idler wheel 112 is circular with the pivot shaft 166 acting as the center of the radius of curvature. Once the idler wheel 112 has been released, access to the line of solder is available through the panel 208. Upon sliding the panel to the right, the line of solder may be grasped and pulled past the separated pinch wheels and into the slightly flared receiving tapered end 160 of the outlet tube 126. The pinch wheel release button 120 may be relaxed permitting the coil spring 168 to force the lever arm 164 back into the normal position. At this point, the trigger actuator 190 may be operated closing the combination on-off, rate control trigger switch 106 forcing the drive pinch wheel 110 to pull the line of solder through the outlet to 126.

Figure 10:
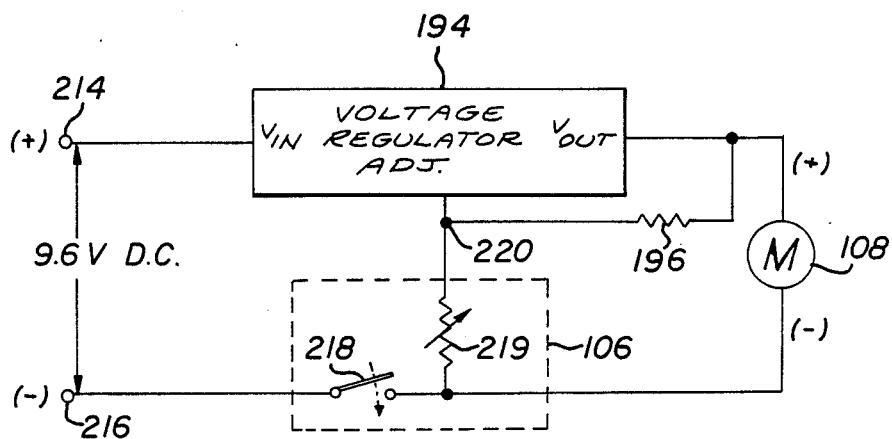
FIG. 10 is a control circuit diagram of the solder dispensing apparatus of FIG. 7.

A suitable electrical circuit which may be incorporated within the dispensing apparatus 100 may include the combination on-off, rate control trigger switch 106 and the electric motor 108 as is shown in FIG. 10. The output of the rechargeable power supply 104 is delivered to a pair of electrical terminals 214, 216 for providing approximately 9.6 volts D.C. to the input of the motor circuit as is illustrated in FIG. 10. The voltage regulator 194 is shown in a series connection with the electric motor 108. The voltage regulator includes three pin connectors extending therefrom of which the first pin is labeled $V_{in}$ which designates the input voltage to the regulator.

Likewise, the output voltage from the regulator is indicated by the designation $V_{out}$. The third pin extending from the voltage regulator is an adjustment pin designated ADJ. on the electrical schematic diagram. The $V_{in}$ pin is connected to the electrical terminal 214 having a positive plurality while the $V_{out}$ pin of the regulator is connected to the positive pole of the motor. Connected to the ADJ. pin of the regulator is an adjacent end of the resistor 196, the opposite end of which is connected the positive pole of the motor.

The trigger switch 106 is shown in a dotted configuration indicating the combination of the on-off and potentiometer devices enclosed in a single housing. For clarity, the on-off switch portion of the trigger switch 106 will be designated an on-off switch 218 while the variable potentiometer of the trigger switch will be designated a potentiometer 219 as clearly shown in FIG. 10. The on-off switch 218 is in a series connection with the motor while the potentiometer 219 is in a parallel connection with the motor. The ADJ. pin of the voltage regulator divides at the electrical node or junction point 220 for connecting to the potentiometer 219 and the resistor 196.

To operate the electric motor 108 and thus the dispensing apparatus 100, the trigger actuator 190 is depressed for closing the on-off switch 218 and for simultaneously adjusting the potentiometer 219. Once the on-off switch is closed, the input voltage is applied to the motor circuit. The voltage regulator 194 is designed to operate in the following manner. If the trigger switch 106 is operated so that the value of the potentiometer resistance is high, then fewer milliamps of electric current will flow through the potentiometer 219 to the negative side of the circuit resulting in a smaller voltage drop across the potentiometer. Therefore, the amount of electric current flow from the regulator 194 to the motor 108 is higher than it otherwise would be if the potentiometer resistance were varied to a lower level.

The higher the value of potentiometer resistance, the higher the value of output voltage supplied at the $V_{out}$ terminal of the regulator. Consequently, a higher voltage is applied at the motor input terminals. In distinction, the lower the value of the potentiometer resistance, the higher the current flowing through the potentiometer resulting in a higher voltage drop across the potentiometer. Therefore, less voltage is available to be supplied at the $V_{out}$ terminal of the regulator and consequently, less voltage is available to be delivered to the motor input terminal.

The level of depression of the trigger actuator 190 determines the resistance of the potentiometer 219 and ultimately the voltage at the input terminals of the motor 108. The output of the nickel-cadmium rechargeable power supply 104 is nomially rated at 9.6 volts D.C. while the D.C. motor may have a higher maximum voltage rating which should not be exceeded if damage to the motor is to be avoided. However, the motor 108 may operate on a lower input voltage if such lower input voltage produces sufficient starting torque. Characteristically, a three volt drop is experienced across the voltage regulator 194. Therefore, the voltage present at the input terminals of the motor may be substantially lower than the maximum voltage rating but still create sufficient starting torque for providing adequate operation for the purposes intended. By limiting the input voltage to the motor, heat generation and potential damage to the components of the voltage regulator is avoided.

The current flow from the regulator to the potentiometer 219 must pass the node 220 requiring the current to split according to the voltage dividing ratio of the resistances of the potentiometer 219 and the resistor 196. Although the potentiometer serves the purpose of controlling the amount of current flow through the motor, the resistor which may nominally be in the range of 220 ohms acts to provide a load on the motor circuit and to provide a bypass around the regulator 194 for limiting the voltage output at the $V_{out}$ pin. The combination of the on-off switch 218 and the potentiometer 219, each located within the trigger switch 106 permits control of the input voltage to the electric motor 108. Such a design results in the ability to precisely control the speed of the motor providing very slow solder feed rates which contributes to cleanly soldered joints.

A rear view of the solder spool 116 illustrates the threaded chamber 144 with the keyway 146 formed within a hub 222 of the spool as is illustrated in FIG. 11. Also shown is the cranking handle 148 employed for rotating the matching key 150 that fits into the keyway 146 of the spool. The cranking handle may be comprised of metal or high strength plastic. In operation, an end 224 of the cranking handle 148 is inserted into the threaded channel 144 until the key 150 is completely inserted into the keyway 146 as is more clearly illustrated in FIG. 12. The matching key 150 is shown inserted into the keyway 146 so that the cranking handle 148 is in position to be rotated. The threaded channel 144 is shown as the hollow interior of a spool support arm 226 which receives the solder spool 116. The support arm 226 fits through a center penetration 228 of the solder spool 116 as shown in FIG. 13.

It is the interior of the spool support arm 226 which forms the threaded channel 144 for receiving the retaining screw 140 as is illustrated in FIGS. 7 and 12. Note that the end 224 of the cranking handle 148 has a smaller outer diameter than the inner diameter of the threaded channel thus permitting free movement of the end of the cranking handle. The cranking handle 148 when fitted into the threaded channel 144 of the spool support arm 226 creates a simple replenishing mechanism 230 for replenishing the solder spool 116 with a supply of solder suitable for soldering electronic components. The solder spool 116 is shown mounted on the spool bracket 138 which is connected to the casing 128 of the dispensing apparatus 100. The center penetration 228 is shown through the hub 222 in which the retaining screw 140 and the washer 142 have been removed as shown in FIG. 13. In their place, the end 224 of the cranking handle 148 has been inserted into the threaded channel 144 so that the matching key 150 is securely mounted within the keyway 146 as is illustrated in FIG. 12.

The solder dispensing apparatus 100 is placed in close proximity to a master solder spool 234 which includes a center axle 236 which is seated in a U-shaped support 238 extending from a support stand 240. During normal operations, the line of solder 114 is pulled from the revolving master solder spool 234 and held to the hub 222 of the solder spool 116. The cranking handle 148 is then manually rotated in a counterclockwise manner for causing the line of solder to be removed from the master solder spool and taken up on the solder spool 116. Once the solder spool is replenished with solder, the line of solder 114 may be physically separated as with a pair of wire snips while the end of the line of solder extending from the solder spool 116 is directed into the input tube 154. The line of solder is forced through the input tube until the tapered end 158 of the inlet tube is reached. Thereafter, the pinch wheel release button 120 may be depressed so that the line of solder may be fished through to the receiving threaded end 160 of the outlet tube 126 as previously described.

The support stand 240 of the master solder spool 234 may be mounted to a fixed support as by a plurality of fasteners 242. When a solder dispensing apparatus 100 has expended the supply of solder, the replenishing mechanism 230 may be employed for replenishing the supply of solder for minimizing the loss of time in the soldering task. The support stand 240, the center axle 236 and the associated mechanical fasteners 242, and the cranking handle 148 each may be inexpensively fabricated out of high strength plastic or similar materials and in combination are an asset for minimizing lost time associated with replenishing the solder supply to each individual dispensing apparatus 100.

The solder dispensing apparatus is universally adaptable for both low wattage and high wattage usage. Examples of low wattage usage include use in combination with discrete electrical components and printed circuit boards while an example of high wattage usage includes soldering applications for large gauge wire. The dispensing apparatus can be used for general soldering, however, it may also be classified as a special soldering tool because of the extension tip 118. The ability to maneuver the dispensing apparatus through clusters of wire and coaxial cable obstructions and the ability to support the line of solder 114 by employing the extension tip 118 for reaching the designated solder joint 122 illustrates the utility of the present invention.

The apparatus makes it possible to dispense a line of solder to one side of the printed circuit board 300 while the soldering iron 320 is applied to the opposite side of the board. This capability simplifies the requirement of completely filling the preformed penetrations 306 with solder for maximizing the electrical conductivity through the coaxial conductors 302. Further, the proper amount of solder may be deposited to the solder pad 318 without physically contacting the delicate coaxial cables distributed across the printed circuit board and within a time limit for avoiding damage to the insulation of the coaxial conductor caused by heat accummulation at the solder pad.

The solder spool 116 is capable of stocking sufficient solder for bonding hundreds of solder joints 122. However, replenishment is available with minimum interruption by utilizing the replenishing mechanism 230 including the cranking handle 148, which is supplied with the dispensing apparatus. The operation of the electric motor 108 results in a relatively small electrical load on the rechargeable power supply 104. It is anticipated that a fully charged nickel-cadmium battery will provide sufficient power for the soldering performed during a regular work shift. When the power supply requires recharging, the alternating current power pack recharging device which is included with the dispensing apparatus can be employed.

From the foregoing, it will be appreciated that the solder dispensing apparatus 100 of the present invention provides for substantial improvement in the maneuverablility and the dispensability of the line of solder 114 to any of a plurality of designated joints 122 through the maze of wiring obstructions located on a computer printed circuit board, and further reduces the probability of thermal damage to the delicate coaxial cable insulation 124 by direct contact with molten solder. Further, the extension tip 118 mounted on the solder outlet tube 126 permits access to both sides of the circuit board and permits completion of a cleanly soldered joint 122 within the critical time period for avoiding conductor insulation damage caused by heat accummulation. The combination on-off rate control trigger switch 106 provides sensitivity to speed changes resulting in very slow solder feed rates further contributing to cleanly soldered joints. Finally, the solder replenishing means insures convenient reloading of and access to the dispensing drive mechanism.

While a particular form of the invention has been illustrated and described, it will be apparent that various modifications can be made without departing from the spirit and scope of the invention. Accordingly, it is not intended that the invention be limited, accept as by the appended claims.

I claim:

1. A solder dispensing apparatus comprising, in combination:
   housing means having a body and a handle;
   driving means disposed within said body, said driving means operating a pulling means for moving a line of solder through a passageway located within said housing means;
   energizing means mounted within said handle for electrifying said driving means;
   controlling means disposed within said housing means for connecting said driving means to said energizing means and for limiting the speed of said driving means;
   regulating means in electrical communication with said driving means for maintaining a constant input voltage to said driving means;
   reducing means disposed between said driving means and said pulling means for providing improved speed change sensitivity; and
   extending means in mechanical communication with said passageway for providing improved maneuverability and dispensibility of said line of solder to a designated solder joint.

2. The solder dispensing apparatus of claim 1 further including a means for supplying said line of solder to said pulling means.

3. The solder dispensing apparatus of claim 1 wherein said housing means comprises a casing.

4. The solder dispensing apparatus of claim 1 wherein said housing means is comprised of plastic.

5. The solder dispensing apparatus of claim 1 wherein said driving means comprises an electric motor.

6. The solder dispensing apparatus of claim 1 wherein said pulling means is comprised of a plurality of pinch wheels.

7. The solder dispensing apparatus of claim 6 wherein said plurality of pinch wheels is comprised of a driving pinch wheel and an idler pinch wheel.

8. The solder dispensing apparatus of claim 1 wherein said passageway is comprised of a solder inlet tube and a solder outlet tube with each tube having a tapered opening adjacent to said pulling means.

9. The solder dispensing apparatus of claim 1 said energizing means comprises a battery.

10. The solder dispensing apparatus of claim 1 wherein said controlling means comprises a combination on-off switch and variable potentiometer enclosed in a single trigger switch.

11. The solder dispensing apparatus of claim 1 wherein said regulating means comprises a voltage regulator mounted on a printed circuit board.

12. The solder dispensing apparatus of claim 1 wherein said reducing means comprises a plurality of reduction gears assembled for accurately transmitting a rotational motion from said driving means to said pulling means.

13. The solder dispensing apparatus of claim 1 wherein said extending means comprises a solder extension tip mounted to the forward end of said body.

14. The solder dispensing apparatus of claim 2 wherein said supplying means comprises a solder spool mounted on a spool bracket in mechanical communication with said housing means.

15. The solder dispensing apparatus of claim 1 further including a release button, said release button having a linkage shaft for disengaging said pulling means for threading said line of solder through said dispensing apparatus.

16. A solder dispensing apparatus comprising, in combination:
   a casing having a body and a handle;
   a motor disposed within said body, said motor operating a pair of pinch wheels for moving a line of solder through an input tube and an output tube located within said casing;
   a direct current power supply mounted within said handle for electrifying said motor;
   a trigger switch comprised of an on-off switch and a variable potentiometer disposed within said casing for connecting said motor to said power supply and for limiting the speed of said motor;

a voltage regulator mounted on a printed circuit board and in electrical communication with said motor for maintaining a constant input voltage to said motor;

a plurality of reduction gears disposed between said motor and said pair of pinch wheels for providing improved speed change sensitivity; and an extension tip mounted to the forward end of said body and in mechanical communication with said outlet tube for providing improved maneuverability and dispensibility of said line of solder to a designated solder joint.

17. A solder dispensing apparatus comprising, in combination:

housing means having a body and a handle;

driving means disposed within said body, said driving means operating a pulling means for moving a line of solder through a passageway located within said housing means;

energizing means mounted within said handle for electrifying said means;

regulating means mounted on a printed circuit board and in electrical communication with said driving means for maintaining a constant input voltage to said driving means;

reducing means disposed between said driving means and said pulling means having a push button connected to a linkage shaft and a spring-loaded lever arm for disengaging said pulling means for threading said line of solder through said dispensing apparatus; and extending means mounted to the forward end of said body and in mechanical communication with said passageway for providing improved maneuverability and dispensibility of said line of solder to a designated solder joint.

18. A solder dispensing apparatus comprising, in combination:

housing means having a body and a handle;

driving means disposed within said body, said driving means operating a pulling means for moving a line of solder through a passageway located within said housing means; 'energizing means mounted within said handle for electrifying said driving means;

controlling means disposed within a single trigger switch in said housing means for connecting said driving means to said energizing means and for limiting the speed of said driving means;

regulating means mounted on a printed circuit board and in electrical communication with said driving means for maintaining a constant input voltage to said driving means;

reducing means disposed between said driving means and said pulling means for providing improved speed change sensitivity;

slide accessing means mounted in a side of said body for providing access to said pulling means and said passageway for threading said line of solder through said dispensing apparatus; and extending means mounted to the forward end of said body and in mechanical communication with said passageway for providing improved maneuverability and dispensibility of said line of solder to a designated solder joint.

19. A solder dispensing apparatus comprising, in combination:

housing means having a body and a handle;

driving means disposed within said body, said driving means operating a pulling means for moving a line of solder through a passageway located within said housing means;

energizing means mounted within said handle for electrifying said driving means;

controlling means disposed within a single trigger switch in said housing means for connecting said driving means to said energizing means and for limiting the speed of said driving means;

regulating means mounted on a printed circuit board and in electrical communication with said driving means for maintaining a constant input voltage to said driving means;

reducing means disposed between said driving means and said pulling means for providing improved speed change sensitivity;

replenishing means in mechanical communication with said housing means, said replenishing means comprising a spool disposed on a spool support arm, said spool support arm including a channel for receiving an end of a cranking handle for rotating said spool about said support arm for replenishing said spool with said line of solder; and extending means mounted to the forward end of said body and in mechanical communication with said passageway for providing improved maneuverability and dispensibility of said line of solder to a designated solder joint.

20. A method for operating a solder dispensing apparatus, said method comprising the steps of:

providing a casing having a body and a handle;

disposing a motor within said body for operating a pair of pinch wheels for moving a line of solder through an input tube and an output tube located within said casing;

mounting a direct current power supply within said handle for electrifying said motor;

locating a trigger switch within said casing for connecting said motor to said power supply and for limiting the speed of said motor, said trigger switch comprised of an on-off switch and a variable potentiometer;

regulating a plurality of input parameters of said motor for maintaining a constant input voltage;

providing a plurality of reduction gears disposed between said motor and said pair of pinch wheels for improving speed change sensitivity;

entering a side of said casing through a sliding panel for accessing said pair of pinch wheels and said input and output tubes;

disengaging said pair of pinch wheels for threading said line of solder through said solder dispensing apparatus; and extending said output tube with an extension tip mounted to the forward end of said body for providing improved maneuverability and dispensibility of said line of solder to a designated solder joint.

* * * * *